United States Patent
Iwase et al.

(10) Patent No.: US 7,018,752 B2
(45) Date of Patent: Mar. 28, 2006

(54) DISPLAY PANEL AND METHOD OF MANUFACTURING THE SAME

(75) Inventors: Teruhiko Iwase, Nagoya (JP); Seki Yamaguchi, Minamiashigara (JP); Yoshifumi Iida, Minamiashigara (JP); Masanori Ichimura, Minamiashigara (JP); Yoko Tomita, Ebina (JP); Yasuyuki Kobayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/992,796

(22) Filed: Nov. 22, 2004

(65) Prior Publication Data

US 2005/0074681 A1    Apr. 7, 2005

Related U.S. Application Data

(62) Division of application No. 10/166,780, filed on Jun. 12, 2002.

(30) Foreign Application Priority Data

| Jun. 13, 2001 | (JP) | ............................. 2001-178965 |
| Jun. 13, 2001 | (JP) | ............................. 2001-178966 |
| Oct. 18, 2001 | (JP) | ............................. 2001-320622 |
| Oct. 18, 2001 | (JP) | ............................. 2001-320623 |

(51) Int. Cl.
    *G03G 15/20*    (2006.01)
(52) U.S. Cl. .......................................... 430/9; 430/124
(58) Field of Classification Search .................... 430/9, 430/111.4, 124
    See application file for complete search history.

(56) References Cited

U.S. PATENT DOCUMENTS

| 4,631,559 A    | 12/1986 | Kaneko |
| 5,266,427 A  * | 11/1993 | Iwase et al. .................. 430/15 |
| 5,750,303 A    | 5/1998  | Inaba et al. |
| 5,928,827 A    | 7/1999  | Rajan |
| 6,210,776 B1   | 4/2001  | Hill |
| 6,251,505 B1   | 6/2001  | Rakos et al. |
| 6,507,413 B1 * | 1/2003  | Mueller et al. .............. 358/1.9 |
| 6,746,809 B1 * | 6/2004  | Sato et al. ................ 430/110.2 |

FOREIGN PATENT DOCUMENTS

| JP | A-7-84405  | 3/1995 |
| JP | A-10-24518 | 1/1998 |

* cited by examiner

*Primary Examiner*—John L Goodrow
(74) *Attorney, Agent, or Firm*—Oliff & Berridge, PLC

(57) ABSTRACT

A display panel includes a transparent image recording sheet having electrophotographically formed thereon at least a background portion, wherein space factor of pinholes per unit area of the background portion is no greater than $1\times10^{-2}\%$. A method of manufacturing the display panel is also disclosed. The background portion has a transparent optical density of 3.0 or greater and an image portion has a transparent optical density of 1.0 or less, and preferably 0.1 to 1. A toner used for electrophotographically forming the background portion and the image portion has a number average molecular weight of 1,000 to 6,000 and a weight average molecular weight of 30,000 to 150,000 as measured by gel permeation chromatography with respect to a portion of the toner dissolved in tetrahydrofuran, and has respective molecular weight distribution peaks in molecular weight ranges of 1000 to 10,000 and 100,000 to 1,500,000.

2 Claims, 2 Drawing Sheets

DISPLAY PANEL AND METHOD OF MANUFACTURING THE SAME

This is a Division of application Ser. No. 10/166,780 filed Jun. 12, 2002. The entire disclosure of the prior application is hereby incorporated by reference herein in its entirety.

BACKGROUND

1. Field of the Invention

The present invention relates to a display panel formed by electrophotography, and to a method of manufacturing the same. In particular, the invention relates to a display panel including an image portion through which light emitted from a backlight is transmitted, and to a method for manufacturing the display panel. In the invention, the image portion refers to an image area formed with a color toner, and a background portion refers to an image area formed with a black toner.

2. Description of the Related Art

Conventionally, a backlighted display panel comprises a transparent plastic film having electrophotographically formed thereon a color image. The display panel is set on, for example, an overhead projector, which emits light from the backside of the display panel, whereby the emitted light is transmitted through the display panel to project the color image on a screen.

It is technically possible to further develop color image forming technology with respect to the plastic film used in the display panel. Namely, a new display panel comprises a plastic film having formed thereon an image portion and a background portion by fixing a color toner. The display panel is illuminated from its backside with a backlight, whereby light is transmitted only through the image portion of the display panel to display the image portion.

In contrast to display panels used for overhead projectors, display panels used for instrument panels of automobiles need to have image portions with excellent transparency and background portions with excellent light-sealing ability (i.e., an ability to prevent light from transmitted therethrough). While such transparency and light-sealing ability may be controlled in accordance with the concentration of a coloring agent in the color toner and toner mass per unit area on the plastic film, they are usually evaluated by transparent optical density, which is represented by a common logarithm (1/T) of a reciprocal of transmittance T of an illuminated light.

However, when many pinholes are present in the image portion and in the background portion, transmitted light leaks through the pinholes even if the image portion and the background portion satisfy a substantially preferable transparent optical density T across the entire surface. When such display panels are used for automobile instrument panels, they do not satisfy customers' design demands and are regarded as defective. The term "pinholes" used herein refers to tiny holes formed by toner not fixing to portions corresponding to the image portions and to the background portions on the plastic film.

As a result of detailed investigation into how pinholes are generated, the following was understood. In current electrophotography, since the toner is thermally fused at a temperature of about 150° C. or higher to fix the toner on the plastic film, air in the toner layer that forms the image portion and the background portion on the plastic film escapes from the toner layer during the fixing, whereby many pinholes having a circular diameter of about 0.2 mm or less form in the fixed image portion and background portion. When a display panel including an image portion and a background portion that contain many pinholes is illuminated from behind with a backlight, there are unsightly fatal defects in the image quality of the background portion in terms of light-sealing ability because the illuminated light is transmitted through the pinholes.

SUMMARY

The present invention was devised in order to solve the aforementioned conventional problems and to achieve the following objects.

It is a first object of the invention to provide a display panel and a method of manufacturing the display panel that suppress the formation of pinholes when a toner image is electrophotographically formed on an image recording sheet such as a transparent plastic film.

It is a second object of the invention to provide a display panel in which light-sealing ability of a background portion is sufficiently enhanced when a transparent image portion and the background portion are electrophotographically formed on an image recording sheet such as a transparent plastic film.

It is a third object of the invention to provide a display panel, having electrophotographically formed thereon an image portion and a background portion, that is free from image defects, such as fogging and scattering of the electrophotographic toner, BCO, and irregularity, wherein light-sealing ability of the background portion is sufficiently enhanced and the image is not distorted in a high temperature of around 100° C.

It is a fourth object of the invention to provide a display panel, having electrophotographically formed thereon an image portion and a background portion, wherein the number of pinholes in the image portion and background portion is reduced and the image is not distorted in a high temperature of around 100° C.

These objects are achieved by the following means.

A first aspect of a display panel of the invention is a display panel comprising a transparent image recording sheet having electrophotographically formed thereon at least a background portion, wherein space factor of pinholes per unit area of the background portion is no greater than $1 \times 10^{-2}$%.

A second aspect of the display panel of the invention is the display panel according to the first aspect, wherein the display panel is used as a backlight type display panel.

A third aspect of the display panel of the invention is the display panel according to the first aspect, wherein the image recording sheet comprises a plastic film.

A fourth aspect of the display panel of the invention is the display panel according to the first aspect, wherein the background portion is heated after being electrophotographically formed.

A fifth aspect of the display panel of the invention is the display panel according to the first aspect, wherein an image portion is electrophotographically formed on the image recording sheet, and the background portion is light-sealing while the image portion is transparent.

A sixth aspect of the display panel of the invention is the display panel according to the first aspect, wherein a toner used for electrophotographically forming the background portion has a number average molecular weight of 1,000 to 6,000 and a weight average molecular weight of 30,000 to 150,000 as measured by gel permeation chromatography with respect to a portion of the toner dissolved in a tetrahydroftiran, and has molecular weight distribution peaks in molecular weight ranges of 1000 to 10,000 and 100,000 to 1,500,000.

A seventh aspect of the display panel of the invention is the display panel according to the first aspect, wherein a toner used for electrophotographically forming the background portion contains carbon black in an amount of 4.0 to 15% by weight, with toner mass in the background portion being 1.0 to 2 mg/cm$^2$.

An eighth aspect of the display panel of the invention is the display panel according to the first aspect, wherein a toner used in the electrophotography contains, as a binder resin, at least one resin selected from the group consisting of a polyester resin, a polystyrene resin, a styrene-acrylic resin, an epoxy resin, a silicone resin, a polyurethane resin, a polyamide resin and a polyolefin-based resin.

A ninth aspect of the display panel of the invention is the display panel according to the first aspect, wherein the space factor of the pinholes per unit area is no greater than $1\times10^{-3}$%.

A tenth aspect of the display panel of the invention is a display panel comprising a transparent image recording sheet having electrophotographically formed thereon at least a light-sealing background portion and including a transparent image portion, wherein the background portion has a transparent optical density of at least 3.0 and the image portion has a transparent optical density of no more than 1.0.

An eleventh aspect of the display panel of the invention is the display panel according to the tenth aspect, wherein the display panel is used as a backlight type display panel.

A twelfth aspect of the display panel of the invention is the display panel according to the tenth aspect, wherein the display panel is an instrument panel.

A thirteenth aspect of the display panel of the invention is the display panel according to the tenth aspect, wherein a toner used for electrophotographically forming the background portion contains carbon black in an amount of 4.0 to 15% by weight, with toner mass in the background portion being 1.0 to 2 mg/cm$^2$.

A fourteenth aspect of the display panel of the invention is the display panel according to the tenth aspect, wherein a toner used for electrophotographically forming the background portion contains, as a binder resin, at least one resin selected from the group consisting of a polyester resin, a polystyrene resin, a styrene-acrylic resin, an epoxy resin, a silicone resin, a polyurethane resin, a polyamide resin and a polyolefin-based resin.

A fifteenth aspect of the display panel of the invention is the display panel according to the tenth aspect, wherein the image recording sheet comprises a plastic film.

A sixteenth aspect of the display panel of the invention is the display panel according to the tenth aspect, wherein a toner used in the electrophotography has a number average molecular weight of 1,000 to 6,000 and a weight average molecular weight of 30,000 to 150,000 as measured by gel permeation chromatography with respect to a portion of the toner dissolved in tetrahydrofuran, and has respective molecular weight distribution peaks in molecular weight ranges of 1000 to 10,000 and 100,000 to 1,500,000.

A seventeenth aspect of the display panel of the invention is the display panel according to the tenth aspect, wherein the image portion has a transparent optical density of 0.1 to 1.

An eighteenth aspect of the display panel of the invention is the display panel according to the first aspect, wherein the image recording sheet comprises at least a transparent substrate and a printing layer formed on a reverse surface of the transparent substrate, the printing layer comprising at least a light-sealing background portion electrophotographically formed on the reverse surface of the transparent substrate.

A nineteenth aspect of the display panel of the invention is the display panel according to the tenth aspect, wherein the image recording sheet comprises at least a transparent substrate and a printing layer formed on a reverse surface of the transparent substrate, the printing layer comprising at least a light-sealing background portion electrophotographically formed on the reverse surface of the transparent substrate.

A first aspect of a method of the invention is a method of manufacturing a display panel, the display panel comprising a transparent image recording sheet including thereon a background portion electrophotographically fixed to the image recording sheet used a toner, wherein after being fixed on the image recording sheet, the background portion is heated at a temperature where the melt viscosity of the toner becomes $1.0\times10^7$ Pa·s to $1.0\times10^3$ Pa·s.

A second aspect of the method of the invention is the method of according to the twentieth aspect, wherein after being fixed on the image recording sheet, the background portion is heated at a temperature where the melt viscosity of the toner becomes $5.0\times10^5$ Pa·s to $1.0\times10^4$ Pa·s.

BRIEF DESCRIPTION OF THE DRAWINGS

In FIGS. 1 and 2, 10 denotes a plastic film, 20 denotes a charge controlling layer, 30 denotes a printing layer, 31, 32, 33, 34 and 35, and L and R denote imaging portions, respectively, and B denotes a background portion.

DETAILED DESCRIPTION OF EMBODIMENTS

Figure 1:
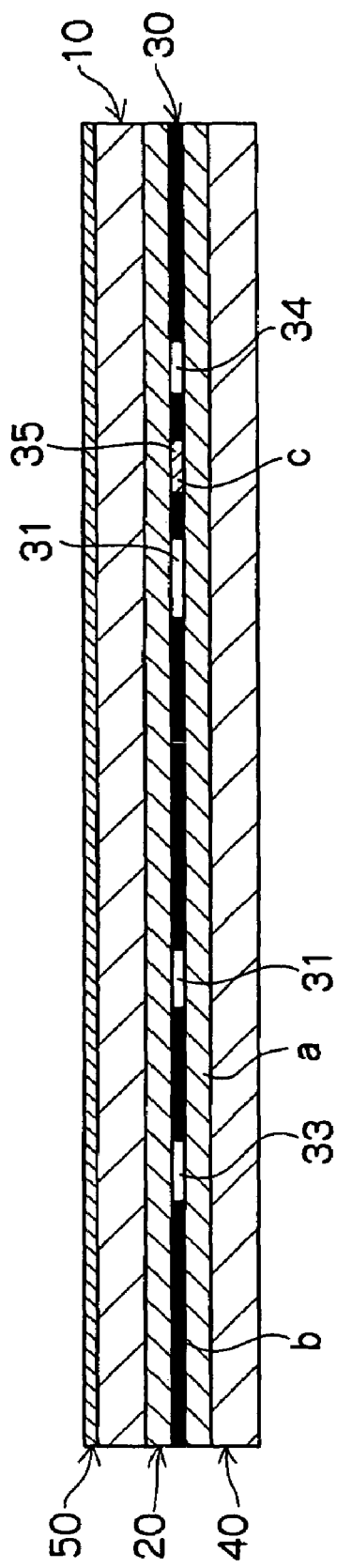
FIG. 1 is a cross sectional view showing an embodiment of an instrument panel for an automobile according to the present invention.

Display Panel and Method of Manufacturing the Same

First Aspect of Display Panel and Method of Manufacturing the Same

A first aspect of a display panel of the invention is a display panel comprising a transparent image recording sheet having electrophotographically formed thereon at least a background portion, wherein space factor of pinholes per unit area of the background portion is no greater than $1\times10^{-2}$%.

The image recording sheet is preferably a plastic film, and the background portion is preferably heated after being electrophotographically formed.

Moreover, it is preferable for a transparent image portion to be electrophotographically formed on the image recording sheet and for the background portion to be light-sealing. The image recording sheet preferably comprises at least a transparent substrate and a printing layer formed on a reverse surface of the transparent substrate, the printing layer comprising at least a light-sealing background portion electrophotographically formed on the reverse surface of the transparent substrate.

A first aspect of a method of the invention is a method of manufacturing a display panel, the display panel comprising a transparent image recording sheet including thereon a background portion electrophotographically fixed to the image recording sheet used a toner, wherein after being fixed on the image recording sheet, the background portion is heated at a temperature where the melt viscosity of the toner becomes $1.0\times10^7$ Pa·s to $1.0\times10^3$ Pa·s.

It is preferable that the melt viscosity of the toner is $5.0\times10^5$ Pa·s to $1.0\times10^4$ Pa·s. It is preferable for a binder resin for the toner to be selected from a group comprising polyester resin, polystyrene resin, styrene-acrylic resin, epoxy resin, silicone resin, polyurethane resin and polyamide resin.

It is particularly preferable for the display panel and the method of the invention to be directed to a backlight type display panel.

One embodiment in which the first aspect of the invention is applied for a backlight type dial of an instrument panel of a vehicle will be described hereinafter. In the dial in this embodiment, an arc of the dial is formed as a transparent image portion on the surface of a transparent plastic film, and a light-sealing background portion is formed on the surface of the same plastic film except the portion where the image portion has been formed. The image portion is displayed by illuminating the dial from its back side.

The color toner used for forming the image portion and background portion comprises a binder resin and a coloring agent as principal ingredients. Examples of the binder resin of the color toner include homopolymers of styrene based monomers such as styrene and chlorostyrene; homopolymers of monoolefin based monomers such as ethylene, propylene, butylene and isoprene; homopolymers of vinyl ester based monomers such as vinyl acetate, vinyl propionate and vinyl benzoate; homopolymers of α-methylene aliphatic monocarboxylic acid ester based monomers such as methyl acrylate, ethyl acrylate, butyl acrylate, dodecyl acrylate, octyl acrylate, phenyl acrylate, methyl methacrylate, butyl methacrylate and dodecyl methacrylate; homopolymers of vinylether based monomers such as vinylmethyl ether, vinylethyl ether and vinylbutyl ether, or homopolymers of vinylketone based monomers such as vinylmethyl ketone, vinylhexyl ketone and vinylisopropenyl ketone, or copolymers comprising at least two of styrene based monomers, monoolefin based monomers, vinylester based monomers, α-methylene aliphatic monocarboxylic acid ester based monomers, vinylether based monomers and vinylketone based monomers.

In particular, representative binder resins include homopolymers such as polystyrene, polyethylene and polypropylene; and copolymers such as styrene-acrylic acid ester copolymer, styrene-methacrylic acid ester copolymer, styrene-acrylonitrile copolymer, styrene-butadiene copolymer and styrene-maleic anhydride copolymer. Representative binder resins further include polyester, polyurethane, epoxy resin, silicone resin, polyamide, modified resin, paraffin and wax. Polyester is most suitable as the binder resin among them. For example, a linear polyester resin comprising a polycondensation product mainly comprising bisphenol A and polyfunctional aromatic carboxylic acid as monomers is preferable.

The polyester resin used by the present invention is synthesized by polycondensation from a polyol component and an acid component. Examples of the polyol component include ethyleneglycol, propyleneglycol, 1,3-butanediol, 1,4-butanediol, 2,3-butanediol, diethyleneglycol, triethyleneglycol, 1,5-butanediol, 1,6-hexanediol, neopentylglycol, cyclohexanedimethanol, bisphenol A/ethylene oxide adduct and bisphenol A/propylene oxide adduct. Examples of the acid component include maleic acid, fumaric acid, phthalic acid, isophthalic acid, terephthalic acid, succinic acid, dodecenyl succinic acid, trimellitic acid, pyrromellitic acid, cyclohexane tricarboxylic acid, 1,5-cyclohexane dicarboxylic acid, 2,5,7-naphthalene tricarboxylic acid, 1,2,4-naphthalene tricarboxylic acid, 1,2,5-hexane tricarboxylic acid, 1,3-dicarboxyl-2-methylenecarboxypropane tetramethylene carboxylic acid, and anhydrides thereof. A plurality of resins among them may be blended.

Representative examples of coloring agents in the color toner include carbon black as a black pigment, and C.I pigment red 48:1, C.I pigment red 122 and C.I pigment red 57:1 as magenta colored pigments. The other representative coloring agents include C.I. pigment yellow 97, C.I. pigment yellow 12 and C.I. pigment yellow 180 as yellow pigments, and C.I pigment blue 15:1 and C.I pigment blue 15:3 as cyan colored pigments.

A white coloring agent is frequently used in the image portion in the backlight type dial as used in this embodiment. While examples of the white coloring agent include titanium oxide, silica, tin oxide, aluminum oxide and magnesium oxide, titanium oxide is preferable from the view point of light durability. While rutile, anatase and brookite type titanium oxide is well known, rutile type titanium oxide is preferable considering light-sealing ability to be described hereinafter. In addition, the surface of rutile type titanium oxide is preferably surface-treated with alumina or silica in order to improve durability to a light.

The transparent image portion is required to be transparent and the background portion is required to have light-sealing ability when they are used for the backlight type dial. Such transparency and light-sealing ability are controlled by the concentration of the coloring agent in the color toner and by the mass of the toner per unit area TMA (Toner Mass per Area) on the surface of the plastic film. It is desirable in this embodiment that the transparent optical density T of the image portion is in the range of 0.1 to 1.0 while the transparent optical density of the background portion is 2.5 or more.

The toner images (image portion and background portion) fixed by heat on the plastic film by electrophotography are heat-treated at a temperature where the melt viscosity falls within a prescribed range, or in a range of $1.0\times10^7$ Pa·s to $1.0\times10^3$ Pa·s. The melt viscosity of the color toner is made to fall within a prescribed range as described above, because the inter-molecular aggregation force of the binder resin becomes so weak within this melt viscosity range that the binder resin may be relatively easily behaves as a viscous fluid. It was confirmed that the color toner of the toner image becomes fluid by heat-treating the toner image (image portion and background portion) on the plastic film for about 10 minutes to about 1 hour at a temperature where the melt viscosity of the color toner falls within a prescribed melt viscosity range, thereby filling pinholes formed on the toner image before the heat treatment. The color toner does not become sufficiently fluid when the melt viscosity is higher than $1.0\times10^7$ Pa·s, while the color toner becomes excessively fluid and the toner image is distorted when the melt viscosity is less than $1.0\times10^3$ Pa·s.

The melt viscosity of the color toner for forming the toner image is measured as follows in this embodiment. When a CFT-500C type flow tester made by Shimadzu Corporation is used for this measurement, the extrusion diameter and extrusion thickness of the flow tester are adjusted to 0.5 mm and 1.0 mm, respectively, and an extrusion load of 100 kg is applied to the nozzle. Then, after pre-heating at an initial temperature of 70° C. for a pre-heating time of 300 seconds, the melt viscosity of the toner is measured at each temperature during the process for increasing the temperature at a constant heating speed of 5° C./min.

The number of pinholes is evaluated as follows. A type FT image processing analyzer (trade name Luzex, made by Nireco Corporation) is used for the evaluation. The toner image is imported in the image processing analyzer from a television camera, and the total area of the pine holes on the toner image is measured.

According to the results by this measurement, the proportion occupied by the pinholes per unit area of the toner image (space factor) can be reduced to $1 \times 10^{-2}$% or less by heat-treating at a temperature where the melt viscosity falls within a prescribed range, thus making the toner image sufficient for use as the backlight type scale panel.

A charge controlling agent and additives such as wax may be incorporated in the color toner, if necessary. Examples of the charge controlling agent include metal complexes of azo-dyes, and metal complexes or metal salts of salicylic acid or alkylsalicylic acid. Examples of the wax include olefin based waxes such as low molecular weight polyethylene and low molecular weight polypropylene, plant based waxes such as carnaba wax, and animal and mineral origin waxes. The mean particle diameter of the color toner is 30 µm or less, preferably in a range of 4 µm to 20 µm. A fluidizing agent including silica, titanium oxide and aluminum oxide may be added to the color toner.

The color toner is used as a two component electrostatic image developer by mixing with an appropriate carrier. Such carrier includes ferrite, magnetite, iron powder or iron ferrite and magnetite, or an iron powder the surface of which is coated with a coating resin such as a styrene resin, fluorinated resin, silicone resin and epoxy resin. These carriers may be used as a semiconductive or conductive carrier by adding carbon black or a metal oxide based conductive powder in the coating resin. The particle diameter of the carrier is usually adjusted in the range of 20 µm to 100 µm.

Examples of the transparent plastic resin to be used as an image recording sheet in this embodiment include a polyethylene terephthalate film, polysulfone film, polyphenylene oxide film, polyimide film, polycarbonate film, cellulose ester film and polyamide film. The polyethylene terephthalate film is preferable among them from the view point of heat resistance and transparency. The plastic films described above are required to have a sufficient thickness enough for both preventing wrinkles from generating when they are softened by heating for heat-fixing by electrophotography, and being possible to apply processing such as cutting and perforation after forming the toner image. While the plastic film is usually required to have a thickness of 100 µm or more, preferably 120 µm or more, the upper limit of the thickness of the plastic film is restricted to be 200 µm or less considering light transmittance.

In the display panel according to the first aspect of the present invention, which is particularly exposed to a stress at a high temperature, a toner used for forming a background portion by electrophotography satisfies a number average molecular weight of 1,000 to 6,000 and an weight average molecular weight of 30,000 to 150,000 as measured by gel permeation chromatography with respect to a portion of the toner dissolved in tetrahydrofuran (THF), and has molecular weight distribution peaks in the molecular weight regions of 1,000 to 10,000 and 100,000 to 150,000.

Further, the aforementioned toner contains carbon black in a range of from 4.0 to 15 wt %, and the mass of the toner per unit area in the background portion is in the range of from 1.0 to 2 mg/cm$^2$.

Moreover, the aforementioned toner contains, as a binder resin, at least one of the group consisting of polyester resin, polystyrene resin, styrene-acrylic resin, epoxy resin, silicone resin, polyurethane resin, polyamide resin and polyolefin-based resin.

The electrophotographic toner to be used in the first aspect satisfies a number average molecular weight of 1,000 to 6,000 and an weight average molecular weight of 30,000 to 150,000 as measured by gel permeation chromatography with respect to a portion of the toner dissolved in tetrahydrofuran (THF), and has molecular weight distribution peaks in the molecular weight regions of 1,000 to 10,000 and 100,000 to 150,000. The "number average molecular weight", "weight average molecular weight" and "molecular weight distribution peak" of the THF soluble fraction of the electrophotographic toner to be used in the invention by gel permeation chromatography are named as "specific number average molecular weight", "specific weight average molecular weight" and "specific molecular weight distribution peak", respectively.

The specific number average molecular weight of the electrophotographic toner to be used in the invention is preferably in the range of 1,000 to 6,000, more preferably in the range of 1,500 to 5,000 as described above. The specific weight average molecular weight of the electrophotographic toner to be used in the invention is preferably in the range of 30,000 to 150,000, more preferably in the range of 50,000 to 130,000.

While the application field of the display panel may include home electric appliances, automobiles, building materials and outdoor POPs, durability under various application conditions such as durability to light, heat and water as well as to a heating and cooling cycle and an acid and alkaline is usually required. For example, a meter panel mounted on a vehicle is required to have durability for about 1000 hours at a temperature range of 90 to 100 □ in an Assy test. Durability as used herein corresponds to generation of no defects such as cracking, deformation and color change. The Assy test is a severe test in which the vehicle mounting meter panel is sandwiched between a case board and a face board while making contact with them, and heat and stress are simultaneously imposed as a load.

However, since the electrophotographic toner is usually designed to be fixed on a sheet of paper by heat-melting at a temperature range of 140 to 170 □, the image is suspected to be distorted by fluidity of the toner when it is exposed to a stress at a high temperature. While the toner may be made to hardly flow at a high temperature, or the molecular weight of the bonding resin may be increased for increasing the viscosity of the toner, pulverizing ability of the toner during the manufacturing process of the toner may be deteriorated when the viscosity is too high, thereby decreasing productivity.

When the specific number average molecular weight is smaller than 1,000, and/or when the weight number average molecular weight is smaller than 30,000, the following problems occur: (1) the mechanical strength of the toner itself reduces, and the toner is finely pulverized to readily generate fog; (2) the strength of the image after fixing is so weak that the toner is apt to fall down by folding the image; and (3) since the viscosity of the toner at 100° C. is as low as $1 \times 1^5$ Pa·s, its heat resistance is anxious. In particular, since an Assy body makes contact with a case plate and face plate by assembling when the display panel according to the invention is used for the mater panel for vehicles, the toner may be fluidized to distort the image due to poor heat resistance with the low viscosity at 100° C.

When the specific number average molecular weight is larger than 6,000, and/or when the specific weight average molecular weight is larger than 150,000, on the other hand, the toner becomes difficult to be pulverized.

The specific molecular weight distribution peaks of the electrophotographic toner to be used in the invention fall within the molecular weight ranges of 1,000 to 10,000 and 100,000 to 150,000, preferably within the molecular weight ranges of 2,000 to 8,000 and 200,000 to 1,400,000. The specific molecular weight distribution peak refers to the maximum value in the molecular weight distribution curve. Excellent characteristics such as fixing ability (a property concerning whether the temperature capable of fixing is high or low), heat resistance and pulverizing ability are manifested by restricting the specific molecular weight distribution peak within the ranges above.

Since the low molecular weight component of the electrophotographic toner to be used in the invention refers to a THF soluble component with a molecular weight of 50,000 or less, the proportion of the low molecular weight component is preferably 50 to 95% by weight, more preferably 60 to 95% by weight, relative to the total amount of the THF soluble fraction.

The electrophotographic toner to be used in the invention may contain a THF insoluble gel component. The amount of the gel component is preferably 20% by weight or less, more preferably 15% by weight or less, relative to the total amount of the electrophotographic toner. Dispersing ability of the gel decreases when the proportion of the gel component is 20% by weight or more, thereby generating a toner not containing the coloring agent or reducing pulverizing ability.

In the electrophotographic toner to be used in the present invention, the magenta, yellow, cyan and white toners to be used in the image portion are required to be transparent to a certain extent since they are used by being illuminated with a backlight. Therefore, the transparent optical density should be in the range of 0.1 to 1, preferably in the range of 0.3 to 0.7. Accordingly, the content of the coloring agent in the toner is 4 to 40% by weight, preferably 6 to 35% by weight. In addition, the toner mass per unit area (TMA) on the image recording medium is preferably in the range of 0.3 to 1 mg/cm².

The black toner to be used in the background portion is required to have light-sealing ability, or to have a transparent optical density of 3 or more. The content of carbon black as a coloring agent may be increased, or TMA of the black toner may be increased, in order to enhance the transparent optical density. However, since carbon black is a conductive material, too much content thereof reduces electrical conductivity to result in fog and scattering of the toner due to reduced amount of charge on the toner. Durability to the developer also decreases to cause BCO. Irregular images may appear due to defective transfer of the toner to the image recording medium when TMA is too high. Therefore, the content of carbon black is preferably in the range of 4 to 15% by weight, and TMA of the black toner is preferably in the range of 1 to 2 mg/cm².

While the method for manufacturing the electrophotographic toner to be used in the invention is not particularly restricted, a melt-pulverization method is preferable. According to the melt-pulverization method, the toner is manufactured by mixing each toner material with a Bumbary mixer, kneader coater, continuous mixer or extruder, followed by melt-kneading, pulverization and classification. The volume average particle diameter of the toner is 30 µm or less, preferably 4 to 20 µm.

The electrophotographic toner to be used in the invention is used as a two component developer by mixing with an appropriate carrier. As the carrier, any well-known carriers can be used. Specifically, ferrite, magnetite, iron powder, and these materials coated with a styrene-based resin, fluorine-based resin, silicone-based resin or epoxy-based resin on surfaces thereof are used. Alternatively, a semiconductor or conductive carrier with carbon black or metallic oxide-based conductive powder added thereto can also be used. The particle size of the carrier used herein is generally set in the range of 20 to 100 µm.

The mixing ratio by weight of the toner in the two component developer controls the amount of charge on the toner while determining the limit of development capacity of the toner. This mixing ratio is an important factor for determining TMA, and is adjusted to be 2 to 12% by weight in the invention. The amount of charge may be too high, and the upper limit of the development capacity of the toner may be too small when the proportion is smaller than 2% by weight, making it difficult to obtain desired TMA. When the ratio is larger than 12% by weight, on the other hand, the amount of charge becomes so low that fog and scattering of the toner may occur.

The display panel according to the invention is required to have an space factor of pinholes per unit area of $1 \times 10^{-3}$% or less. Accordingly, the toner images (image portion and background portion) fixed by heat on the image recording medium by electrophotography is preferably heat-treated at a temperature range where the melt viscosity of the toner falls within a range of $1 \times 10^7$ to $1 \times 10^3$ Pa·s in the display panel according to the invention.

The toner has an appropriate fluidity (to an extent that does not distort the image) in the melt viscosity range of $1 \times 10^7$ to $1 \times 10^3$ Pa·s of the toner, since intermolecular coagulation force of the binder resin as a principal component of the toner becomes relatively weak to readily arise viscous flow, thereby filling the pinholes existing before the heat treatment. In other words, the number of the pinholes may be reduced by the heat treatment as described above. However, a melt viscosity of more than $1 \times 10^7$ Pa·s is not sufficient to arise flow of the resin, while a melt viscosity of less than $1 \times 10^3$ Pa·s readily causes distortion of the toner image. The heating time is 10 minutes to one hour for the heat treatment as described above.

The space factors of the pine holes per unit area of the image portion and background portion, respectively, can be reduced to become $1 \times 10^{-3}$% or less by applying the heat treatment described above in manufacturing the display panel according to the invention, thereby making it possible use the display panel as a backlight type display panel.

Tenth Aspect of Display Panel

A tenth aspect of the invention provides a display panel comprising a transparent image recording sheet having electrophotographically formed thereon at least a light-sealing background portion and including a transparent image portion, wherein the background portion has a transparent optical density of at least 3.0 and the image portion has a transparent optical density of no more than 1.0.

According to the tenth aspect of the display panel of the invention, Preferably, the toner used for electrophotographically forming the background portion contains carbon black in an amount of 4.0 to 15% by weight, with toner mass in the background portion being 1.0 to 2 mg/cm². The toner used for electrophotographically forming the background portion contains, as a binder resin, at least one resin selected from the group consisting of a polyester resin, a polystyrene resin, a styrene-acrylic resin, an epoxy resin, a silicone resin, a polyurethane resin, a polyamide resin and a polyolefin-based resin.

According to the tenth aspect, the image recording sheet is preferably a plastic film. The image recording sheet preferably comprises a transparent substrate and a printing layer formed on the transparent substrate, and the printing layer is preferably formed by forming at least the light-sealing background portion on the reverse surface of the transparent substrate by electrophotographic printing.

According to the tenth aspect of the display panel of the invention, it is particularly preferable to use the display panel as a backlight type display panel and an instrument panel.

Figure 2:
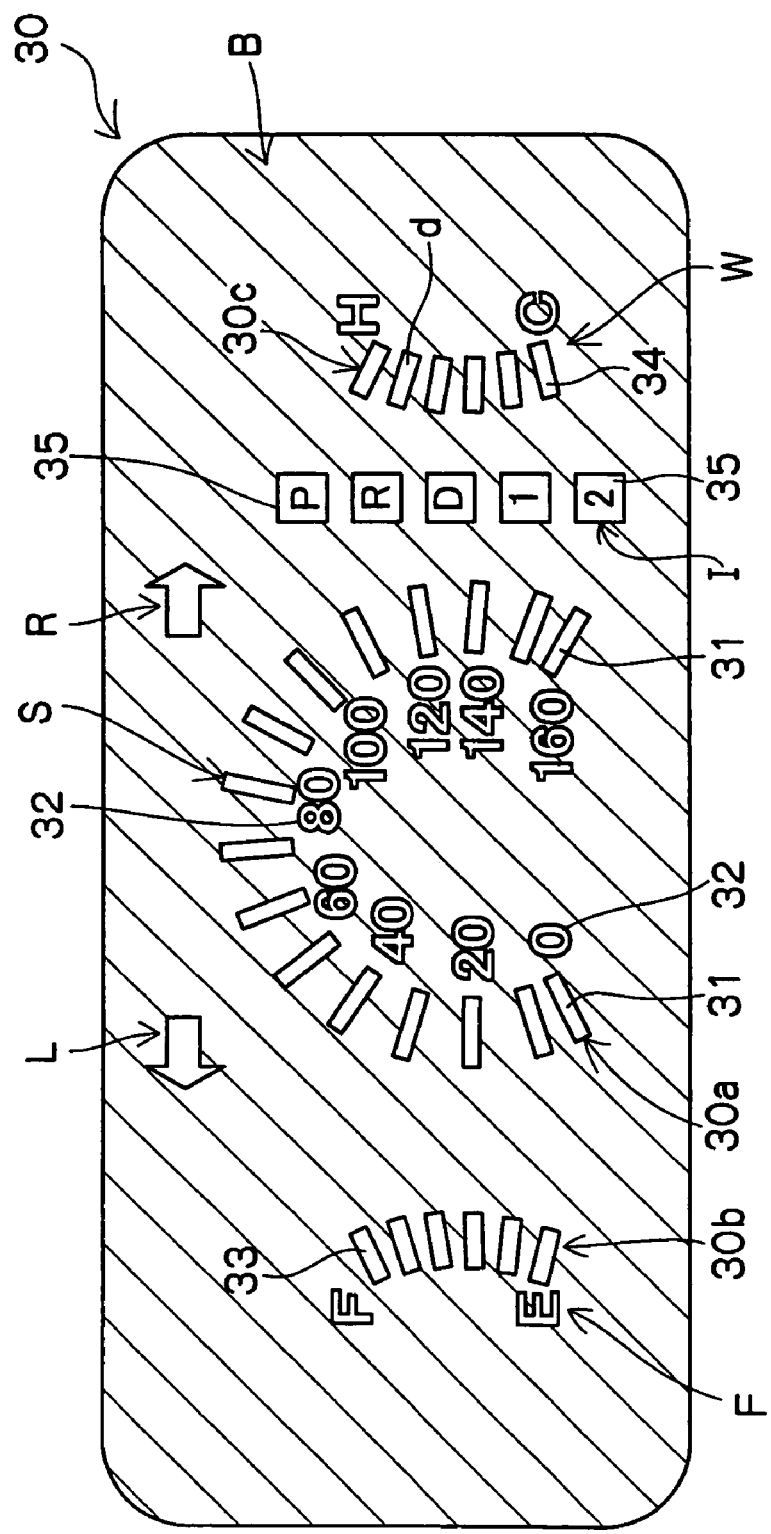
FIG. 2 is a planar view of the instrument panel.

The embodiment of the tenth aspect of the invention will be described hereinafter with reference to the drawings. FIGS. 1 and 2 show the display panel according to the invention applied for a meter panel of an instrument panel of an automobile. This meter panel comprises, as shown in FIG. 1, a transparent substrate 10, a charge controlling layer 20 formed along the back face or reverse surface of the transparent substrate 10, a printing layer 30 laminated on the back face or reverse surface of the transparent substrate 10 via the charge controlling layer 20, a protective layer 40 laminated on the back face or reverse surface of the transparent substrate 10 via the printing layer 30 and charge controlling layer 20, and a luster controlling layer 50 formed along the surface of the transparent substrate 10. A laminated comprising the transparent substrate 10, charge controlling layer 20 and printing layer 30 is named as a main frame of the instrument panel.

The printing layer 30 is formed by printing from the back face or reverse surface side along the charge controlling layer 20 forming a layer, and this printing layer 30 is constructed so as to have three dial layer S, F and W, a shift indicator layer I and both direction indicators L and R in the background layer B as shown in FIG. 2 (see the oblique line area in FIG. 2).

The dial layer S is formed at the center of the printing layer 30 toward the left and right direction in FIG. 2, and this dial layer S has a scale part 30a as shown in FIG. 2. The scale part 30a is formed into an arc along the outer circumference of the dial layer S. A plurality of scales 31 are arranged forming an arc while aligning a plurality of FIG. 32 along the inner circumference of the scale 31.

A dial layer F is formed at the left side on the printing layer 30 in FIG. 2, and provided with a scale part 30b as shown in FIG. 2. The scale part 30b is formed into an arc along the outer circumference at the left-side of the dial layer F. A plurality of scales 33 are arranged in an arc on the scale part 30b, and two capital letters "F" and "E" are placed at top and bottom end at the left-side of the scale 33.

A dial layer W is formed at the left side of the printing layer 30 as shown in FIG. 2, and is provide with a scale part 30c as shown in FIG. 2. The scale part 30c is formed into an arc along the outer circumference at the left side of the dial layer W. A plurality of scales 34 are arranged as an arc on the scale part 30c, and two capital letters "H" and "C" are placed at the top and bottom at the right side of the scale 34.

The dial layer S as well as the transparent base film 10, charge controlling layer 20, protective layer 40 and luster controlling layer 50 corresponding thereto constitute a dial for a speed meter of a passenger car. The dial layer F as well as the transparent base film 10, charge controlling layer 20, protective layer 40 and luster controlling layer 50 corresponding thereto constitute a dial for a fuel gauge of the passenger car. The dial W as well as the transparent base film 10, charge controlling layer 20, protective layer 40 and luster controlling layer 50 corresponding thereto constitute a dial for an water temperature gauge of the passenger car.

A shift indicator panel layer I comprises a plurality of shift-range indicator parts 35, which sequentially indicate each shift range P, R, D, "1" and "2" of an automatic transmission of the passenger car. The direction indicator mark layers L and R are formed above the dial layer S of the printing layer 30. The shift indicator panel layer I as well as the transparent base film 10, charge controlling layer 20, protective layer 40 and luster controlling layer 50 corresponding thereto constitute a shift indicator panel of the passenger car. Both direction indicator mark layers L and R as well as the transparent base film 10, charge controlling layer 20, protective layer 40 and luster controlling layer 50 corresponding thereto constitute turn-left and turn-right indicator marks of the passenger car.

The method for manufacturing the main frame of the instrument panel, and meter panels using the main frame of the instrument panel will be described below. At first, a plastic film is cut into a prescribed shape to prepare the transparent base film 10 as a transparent image recording sheet. The plastic film used is a polyethylene terephthalate film (for example "Lumiller" made by Toray Industries, Inc. or "Teflex" made by Teijin-DuPont Co.). Then, a charge controlling material mainly comprising a polyester resin is coated on the back face or reverse surface of the transparent substrate 10 at a thickness of several micrometers to form the charge controlling layer 20. This charge controlling layer 20 is provided when necessary. Usually, a surface active agent and a conductive inorganic oxide are added as charge controlling agents so that the surface resistance of the charge controlling layer 20 does not become high.

Subsequently, the printing layer 30 is formed on the back face or reverse surface of the charge controlling layer 20 as follows. Each scale and figure on the dial layer S, each scale and figure on the dial layers F and W, each shift indicator on the shift indicator panel I, and both direction indicator marks L and R constitute a transparent image portion on the main frame of the instrument panel. The portion of the main frame of the instrument panel, excluding each scale and figure on the dial layer S, each scale and figure on the dial layers F and W, each shift indicator on the shift indicator panel I, and both direction indicator marks L and R constitute a light-sealing background portion.

A white layer a, black layer b, and black dotted layer c or red layer d are printed in a layer on the printing layer 30. The light-sealing background portion is formed of the white layer a and black layer b. The second scale 34 from the top of the scales 30c on the dial layer W in FIG. 2 is formed of the white layer a and black layer b. Each shift range indicator and both direction indicator marks L and R of the shift indicator panel layer I are formed of the white layer a and black dotted layer c, and the remaining parts are formed of only the white layer a.

The black layer b is printed twice in order to secure a transparent optical density of 3.0 or more. This enables a transparent optical density of the printed part using a black toner only to be avoided from being insufficient when the panel displays a full color image using three primary colors of cyan, magenta and yellow, and black, while largely reducing incidence of pinholes in the background.

The color toners, representative binder resins incorporated in the toner, and representative examples of the coloring agents of the color toner are the same as used in the display panel according to the first aspect of the invention.

A white coloring agent is frequently used in the image portion of the main frame of the instrument panel in this embodiment. Preferable examples of the white coloring agent is also the same as used in the first aspect.

The transparent image portion is required to be transparent and the background portion is required to have light-sealing ability in the main frame of the instrument panel to be used in the instrument panel. Such transparency and light-sealing ability are adjusted by the concentration of the toner in the color toner and by the toner mass per unit area TMA (Toner Mass per Area) of the surface of the plastic film. The image portion is preferably adjusted to have a transparent optical density in the range of 0.1 to 1.0, more preferably in the range of 0.3 to 0.7, in this embodiment by the adjustment as described above. For attaining the transparent optical density, the content of the coloring agent in the color toner is usually adjusted in the range of 4 to 40 wt %, more preferably in the range of 6 to 35 wt %. The toner mass TMA on the plastic film is adjusted in the range of 0.3 to 1.0 mg/cm$^2$.

On the other hand, the transparent optical density of the background portion is adjusted to 3.0 or more. For enhancing the transparent optical density of the background portion, the content of carbon black as the coloring agent may be increased, or the toner mass TMA of the black toner may be increased. However, since carbon black is electrically conductive, electrical resistance as the color toner decreases when the content of the carbon black is too high, thereby reducing the amount of charge of the color toner to cause color fog and scattering of the toner. In addition, BCO is generated due to low electrical resistance as a developer. Furthermore, transfer of the toner on the plastic film becomes insufficient when the toner mass TMA of the color toner is too high, arising irregular images on the image portion and background portion. Accordingly, in order to make the transparent optical density to be 3.0 or more without arising color fog, scattering of the toner, BCO and irregular images, the content of carbon black should be in the range of 4 to 15 wt % and the toner mass TMA of the black toner should be in the range of 1 to 2 mg/cm$^2$.

Additives such as a charge controlling agent and wax may be incorporated in the color toner, if necessary. Descriptions and preferable examples of the charge controlling agent and wax, mean particle diameter of the color toner, and descriptions of the fluidizing agent to be added in the color toner are the same as described in the first aspect.

The color toner is used as a two component electrostatic developer by mixing with an appropriate carrier. Descriptions and preferable examples of the carrier are the same as those in the first aspect.

Descriptions, preferable examples and preferred thickness of the plastic film in this embodiment are the same as those in the first aspect.

In the tenth aspect of the display panel of the present invention, the toner to be used in electrophotography preferably satisfies a number average molecular weight of from 1,000 to 6,000 and an weight average molecular weight of from 30,000 to 150,000 as measured by gel permeation chromatography with respect to a portion of the toner dissolved in tetrahydrofuran(THF), and which has molecular weight distribution peaks in a molecular weight ranges of from 1000 to 10,000 and from 100,000 to 1,500,000, and the image portion preferably has a transparent optical density of 0.1 to 1.

Descriptions of the "number average molecular weight", "weight average molecular weight" and "molecular weight distribution peak" of the THF soluble fraction of the electrophotographic toner to be used in the invention by gel permeation chromatography are the same as those in the first aspect.

Descriptions of the transparent optical density of the image portion, and the toner production method are also the same as those in the first aspect.

EXAMPLES

The present invention will be described hereinafter with reference to a plurality of examples in relation to comparative examples. The invention is not restricted by these examples.

Examples and Comparative Examples of the First Aspect of Display Panel and Manufacturing Method Thereof Examples 1 to 3 and Comparative Examples 1 and 2

The electrostatic image developer to be used in each example and comparative example was manufactured as follows.

(1) Manufacture of Black Toner as Toner Particles A-1

After thoroughly pre-mixing 93% by weight (wt %) of polyester resin (a linear polyester prepared by polycondensation of terephthalic acid, bisphenol A-ethylene oxide adduct and cyclohexane dimethanol: weight average molecular weight 10,000, Tg 68° C.) with 7 wt % of carbon black (made by Mitsubishi Chemical Co., Ltd., Ltd., #25B) using a Henshel mixer, the mixture was melt-kneaded with a dual screw roll mill followed by cooling. The kneaded product was pulverized with a jet mill after cooling, and was classified twice with an wind classifier, thereby manufacturing a black toner with a mean particle diameter of 8.0 μm.

Then, this black toner particles and an additive-hydrophobic titanium oxide with a BET specific surface area of 100 m$^2$/g were mixed in a weight ratio of 100:0.6 using a Henshel mixer to manufacture the black toner as toner particles A-1. The BET specific surface area is a surface area per unit mass as determined by the amount of adsorption of nitrogen.

(2) Manufacture of Black Toner as Toner Particles B-1

The black toner as a toner particle B-1 was manufactured by the same method as manufacturing the black toner as the toner particles A-1, except that the proportion of carbon black of the polyester resin and carbon black components pre-mixed with the Henshel mixed as described above was changed to 14 wt %.

(3) Manufacture of White Toner as Toner Particles C-1

The white toner as toner particles C-1 was manufactured by the same method as manufacturing the black toner as the toner particles A-1, except that the amount of carbon black of the polyester resin and carbon black components pre-mixed with the Henshel mixed as described above was changed to 35 wt % of titanium oxide (CR60 made by Ishihara Sangyo Kaisha, Ltd.).

(4) Manufacture of Magenta Color Toner as Toner Particles D-1

The carbon black component of the polyester resin and carbon black components pre-mixed with the Henshel mixed as described above was changed to 15 wt % of a mixture comprising C.I. pigment red 122 and C.I. pigment red 57:1 in a weight ratio of 3:2. The magenta color toner as toner particles D-1 was manufactured by changing the composition as described above by the same method as manufacturing the black toner as the tone particles A-1.

(5) Manufacture of Carrier

Ferrite particles (electrical resistance $1\times10^9$ Ω·cm), toluene, a copolymer of perfluorooctylethyl acrylate and methacrylate, carbon black (VXC-72 made by Cabot Co.) and cross-linked melamine resin were prepared in a mass ratio of 100:14:1.6:0.12:0.3. The copolymer was manufactured by copolymerization of perfluorooctylethyl acrylate and methacrylate in a copolymerization ratio of 40:60, and the weight average molecular weight Mw of the copolymer was 50,000.

Each of the four components except the ferrite particles was dispersed for 1 hour with a sand mill to prepare a solution for forming a coating film, and the solution for forming the coating film and the ferrite particles were placed in a vacuum degassing kneader, and the mixture was stirred at 60° C. for 30 minutes. Subsequently, toluene was evaporated off in vacuum to form a coating film on the surface of the ferrite particle, thereby manufacturing the carrier.

(6) Preparation of Electrostatic Image Developer

Each electrostatic image developer was prepared by mixing any one of the black toner, white toner and magenta color toner manufactured as described above, and the carrier in a mass ratio of 6:94. A dial was manufactured by fixing each toner image (image portion and background portion) on the surface of a polyethylene terephthalate film with a thickness of 150 μm with an electrophotographic copy machine (type CRT 60 made by Fuji Xerox Co., Ltd.) using each electrostatic image developer prepared as described above.

Example 1

In the dial, the image portion was manufactured using the white toner as the toner particle C-1 with a toner mass per unit area (named as toner mass TMA hereinafter) of 0.7 mg/cm², and the background portion was manufactured using the black toner as the toner particle A-1 with a toner mass TMA of 1.6 mg/cm². After forming and fixing the toner image as described above, it was heat-treated at 90° C. for 45 minutes. The melt viscosity of the white toner in the image portion was $2\times10^5$ Pa·s, while the melt viscosity of the black toner in the background portion was $1\times10^5$ Pa·s.

Example 2

In the dial, the image portion was manufactured using the white toner as the toner particle C-1 with a toner mass TMA of 0.7 mg/cm², and the background portion was manufactured using the black toner as the toner particle A-1 with a toner mass TMA of 1.6 mg/cm². After forming and fixing the toner image as described above, it was heat-treated at 100° C. for 30 minutes. The melt viscosity of the white toner in the image portion was $3\times10^4$ Pa·s, while the melt viscosity of the black toner in the background portion was $2\times10^4$ Pa·s.

Example 3

In the dial, the image portion was manufactured using the magenta color toner as the toner particle D-1 with a toner mass TMA of 0.8 mg/cm², and the background portion was manufactured using the black toner as the toner particle B-1 with a toner mass TMA of 1 mg/cm². After forming and fixing the toner image as described above, it was heat-treated at 110° C. for 15 minutes. The melt viscosity of the white toner in the image portion was $8\times10^3$ Pa·s, while the melt viscosity of the black toner in the background portion was $4\times10^3$ Pa·s.

Comparative Example 1

In the dial, the image portion was manufactured using the white toner as the toner particle C-1 with a toner mass TMA of 0.7 mg/cm², and the background portion was manufactured using the black toner as the toner particle A-1 with a toner mass TMA of 1.6 mg/cm². Different from each example above, however, no heat treatment was applied after forming the image.

Comparative Example 2

In the dial, the image portion was manufactured using the magenta color toner as the toner particle D-1 with a toner mass TMA of 0.8 mg/cm², and the background portion was manufactured using the black toner as the toner particle B-1 with a toner mass TMA of 1 mg/cm². Different from each example above, however, no heat treatment was applied after forming the image.

The space factor of pinholes was determined with respect to the toner image in each example and comparative example formed as described above, and the results as in Table 1 below were obtained.

TABLE 1

| | Space factor (%) of pinholes in image portion | Space factor (%) of pinholes in background portion |
|---|---|---|
| Example 1 | $3 \times 10^{-4}$ | $7 \times 10^{-4}$ |
| Example 2 | $1 \times 10^{-4}$ | $5 \times 10^{-4}$ |
| Example 3 | $2 \times 10^{-4}$ | $6 \times 10^{-4}$ |
| Comparative Example 1 | $3 \times 10^{-2}$ | $5 \times 10^{-2}$ |
| Comparative Example 2 | $2 \times 10^{-2}$ | $4 \times 10^{-2}$ |

According to Table 1, the space factor of the pinholes in the heat-treated image portion and background portion as in each example above was far more smaller than the space factor of corresponding portions in the comparative examples to which no heat treatment was applied.

As described above, the number of the pinholes in the image portion and background portion can be largely reduced by applying a heat treatment to the image portion and background portion after fixing the image portion and background portion on the plastic film by electrophotography. Accordingly, the projected image is not affected by the pinholes by illuminating the dial manufactured as described above to enable a high quality image to be displayed.

While the prescribed range of the melt viscosity of the color toner was in the range of $1.0\times10^3$ Pa·s to $1.0\times10^7$ Pa·s in the embodiments above, the prescribed range of the melt viscosity of the color toner is desirably in the range of $1.0\times10^4$ Pa·s to $5.0\times10^5$ Pa·s.

While the transparent optical density of the background portion of the dial was 2.5 or more in the embodiments above, the transparent optical density of the background portion is desirably 3.0 or more.

A transparent image may be formed with a corresponding portion of the plastic film in practical applications of the invention, in place of forming the image portion with a toner on the plastic film.

Examples and Comparative Examples of the Tenth Aspect of Display Panel

Examples 4 and 5, and Comparative Examples 3 and 4

(1) Manufacture of Black Toner as Toner Particle A-2

After thoroughly pre-mixing 94 wt % of polyester resin (linear polyester prepared by polycondensation of terephthalic acid, a bisphenol A-ethylene oxide adduct and cyclohexane dimethanol) with 6 wt % of carbon black (#25B made by Mitsubishi Chemical Co., Ltd., Ltd.) in a Henshel mixer, the mixture was melt-kneaded with a dual screw type roll mill followed by cooling. The kneaded product was pulverized with a jet-mill after cooling, and the pulverized powder was classified twice with a wind classifier to manufacture a black toner with a mean particle diameter of 8.0 µm.

The black toner particles were mixed with fine particles of hydrophobic titanium as an additive with a BET specific surface are of 100 m$^2$/g in a weight ratio of 100:0.6 using the Henshel mixer, thereby manufacturing the black toner as the toner particle A-2. The BET specific surface area is a surface area per unit mass as determined by the amount of adsorption of nitrogen.

(2) Manufacture of Black Toner as Toner Particle B-2

A black toner as toner particles B-2 was manufactured by the same manufacturing process as used in the black toner as the toner particle A-2, except that the proportion of the carbon black component of the polyester resin and carbon black components to be pre-mixed with the Henshel mixer as described above was changed to 12 wt %.

(3) Manufacture of Black Toner as Toner Particle C-2

A black toner as toner particles C-2 was manufactured by the same manufacturing process as used in the black toner as the toner particle A-2, except that the proportion of the carbon black component of the polyester resin and carbon black components to be pre-mixed with the Henshel mixer as described above was changed to 16 wt %.

(4) Manufacture of Black Toner as Toner Particle D-2

A black toner as toner particles D-2 was manufactured by the same manufacturing process as used in the black toner as the toner particle A-2, except that the proportion of the carbon black component of the polyester resin and carbon black components to be pre-mixed with the Henshel mixer as described above was changed to 3 wt %.

(5) Manufacture of White Toner as Toner Particle E-2

The white toner as toner particles E-2 was manufactured by the same method as manufacturing the black toner as the toner particles A-2, except that the of carbon black of the polyester resin and carbon black components pre-mixed with the Henshel mixed as described above was changed to 30 wt % of titanium oxide (CR60 made by Ishihara Sangyo Kaisha, Ltd.).

(6) Manufacture of Magenta Color Toner as Toner Particles F-2

The carbon black component of the polyester resin and carbon black components pre-mixed with the Henshel mixed as described above was changed to 12 wt % of a mixture comprising C.I. pigment red 122 and C.I. pigment red 57:1 in a weight ratio of 3:2. The magenta color toner as toner particles F-2 was manufactured by changing the composition as described above by the same method as manufacturing the black toner as the tone particles A-2.

(7) Manufacture of Carrier

Carrier were manufactured by the same methods as in Examples 1 to 3 and Comparative examples 1 and 2, except that the four components A-2, B-2, C-2 and D-2 were used.

(8) Manufacture of Instrument Panel Main Frame

Each electrostatic image developer was manufactured by mixing any one of the black toner, white toner and magenta color toner with the carrier in a weight ratio of 6:94. A printing layer 30 was formed by fixing each toner image (image portion and background portion), using each electrostatic image developer manufactured as described above and an electrophotographic copy machine (type CDT60 made by Fuji Xerox Co.), on a polyethylene terephthalate film as a transparent substrate with a thickness of 150 µm via a charge controlling layer 20 comprising a charge controlling agent (Elegan 264 made by Nippon Oil & Fats CO., Ltd. is dispersed in wax) in a polyester resin.

Example 4

In the main frame of the instrument panel, the image portion was formed using the white toner as the toner particle E-2 with a toner mass TMA of 0.7 mg/cm$^2$, and the background portion was formed using the black toner as the toner particle A-2 with a toner mass TMA of 1.8 mg/cm$^2$.

Example 5

In the main frame of the instrument panel, the image portion was formed using the magenta color toner as the toner particle F-2 with a toner mass TMA of 0.9 mg/cm$^2$, and the background portion was formed using the black toner as the toner particle B-2 with a toner mass TMA of 1.0 mg/cm$^2$.

Comparative Example 3

In the main frame of the instrument panel, the image portion was formed using the white toner as the toner particle E-2 with a toner mass TMA of 0.7 mg/cm$^2$, and the background portion was formed using the black toner as the toner particle C-2 with a toner mass TMA of 0.9 mg/cm$^2$.

Comparative Example 4

In the main frame of the instrument panel, the image portion was formed using the white toner as the toner particle E-2 with a toner mass TMA of 0.7 mg/cm$^2$, and the background portion was formed using the black toner as the toner particle D-2 with a toner mass TMA of 2.2 mg/cm$^2$.

The transparent optical density of each sample in the examples and comparative examples was measured using a HR100 type reflection and transmittance meter made by Murakami Color Research Laboratory. The image quality was visually evaluated. The results are shown in Table 2 below.

TABLE 2

| | Image Portion | | Background Portion | |
|---|---|---|---|---|
| | Transparent optical density | Image Quality | Transparent optical density | Image Quality |
| Example 4 | 0.6 | Good | 3.4 | Good |
| Example 5 | 0.5 | Good | 3.5 | Good |
| Comparative Example 3 | 0.6 | Good | 2.9 | Generation of BCO |

TABLE 2-continued

|  | Image Portion | | Background Portion | |
| --- | --- | --- | --- | --- |
|  | Transparent optical density | Image Quality | Transparent optical density | Image Quality |
| Comparative Example 4 | 0.6 | Good | 2.5 | Generation of Irregular Luminance |

No problems were found in the transparent optical density and image quality in each example and comparative example in Table 2. Although BCO was generated in the background portion in Comparative Example 3 and irregular images were found in the background portion in Comparative Example 4, any particular problem was found in each example.

Since the main frame of the instrument panel is manufactured by fixing the image portion and background portion on the plastic film via the charge controlling layer by electrophotography, image defects such as color fog, scattering, BCO and irregular images can be prevented from being generated while sufficiently enhancing light-sealing ability of the background portion. Accordingly, projected images may be displayed with a high quality when the main frame of the instrument panel manufactured as described above with a backlight from the back side of the panel. Since the printing layer 30 is formed by printing along the back face or reverse surface of the transparent plastic base film 10 via the charge controlling layer 20, the printing layer 30 can be uniformly and reliably fixed on the transparent base film by charge controlling action of the charge controlling layer 20.

Manufacture of the instrument panel as described above is completed by forming the luster controlling layer 50 on the transparent plastic base film 10 followed by forming the protective layer 40 on the back face or reverse surface of the printing layer 30. When the instrument panel manufactured as described above is illuminated with a backlight from its back face or reverse surface, scales and figures of the dial layer S, scales and characters of both dials F and W, and each shift range indicator and both direction indicator marks L and R of the shift indicator panel layer I may be visually recognized as projected images with high image quality through the luster controlling layer 50. The protective layer 40 serves for protecting the printing layer 30, while the luster controlling layer 50 serves for extinguishing luster on the surface of the transparent base film 10.

The protective layer 40 was formed as follows in this embodiment. A UV curing type transparent ink (for example, trade mark "Ray-Cure" made by Jujo Chemical Co., Ltd.) was screen-printed on the back face or reverse surface of the printing layer 30 with a density of 250 meshes. Then, the ink was cured with a metal halide lamp exposure apparatus (120 W) with an illumination distance of 10 cm and a conveyer speed of 5 m/min, thereby forming the protective layer 40 with a thickness of about 10 μm.

Although the transparent optical density of the background portion of the dial was adjusted to be 2.5 or more, it is more preferable to adjust the transparent optical density to 3.0 or more.

The protective layer 40 according to the invention may be formed by forming a laminate by coating an acrylic adhesive at a thickness of 20 to 30 μm on a plastic film with a thickness of 25 μm, followed by pressing this laminate onto the surface of the toner at 2 m/min using a laminator (a dry film laminator made by Hitachi Chemical Co., Ltd.). Otherwise, the protective layer 40 may be formed by forming a laminate by coating a polyester heat adhesive at a thickness of 30 to 50 μm on a plastic film with a thickness of 25 μm, followed by hot-pressing the laminate at 100° C. for 10 seconds with a vacuum laminator. Alternatively, the protective layer 40 may be formed by coating an urethane resin layer with a glass transition temperature of 140° C. on a release layer provided on a plastic film with a thickness of 10 μm, followed by peeling the plastic film only after bonding a laminate having an acrylic adhesive layer on the surface of the toner using a laminator.

The thickness of polyethylene terephthalate plastic film is preferably within the range of preferably 100 to 300 μm in the invention considering printing characteristics of the printing layer. When polycarbonate film is used as the plastic film, a thickness of about 500 μm thereof will cause no practical problems.

The transparent image may be formed only at the corresponding portions of the plastic film in the invention, in place of forming an image portion on the plastic film with a toner.

While the invention was applied to the instrument panel in this embodiment, the main frame of the instrument panel may be used for a display panel of a projector.

Examples and Comparative Examples of the Sixth Aspect of Display Panel

Examples 6 to 9 and Comparative Examples 5 to 9

[Electrophotographic Toner A-3]

(Composition of Electrophotographic Toner A-3)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 60% by weight Polyester resin(polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 34% by weight Carbon black (#25B made by Mitsubishi Chemical Co., Ltd.) 6% by weight (Method for Manufacturing Electrophotographic Toner A-3)

The components above were sufficiently pre-mixed with a Henshel mixer, melt-kneaded with an extruder, and pulverized with a jet mill after cooling. The pulverized powder was classified with a wind classifier to obtain a black toner A-3 with a mean volume diameter of 8.0 μm.

The black toner A-3 (100 parts by weight) and 0.6 parts by weight of hydrophobic titanium fine particles as an additive with a BET specific surface area of 100 $m^2/g$ were mixed with a Henshel mixer to prepare an electrophotographic toner A-3.

(Properties of Electrophotographic Toner A-3)

The specific number average molecular weight, specific weight average molecular weight and specific molecular weight peak of the THF soluble fraction were determined by gel permeation chromatographic measurements by dissolving the electrophotographic toner A-3 obtained in THF. A specific number average molecular weight of 2,000, specific weight average molecular weight of 40,000 and specific molecular weight peak of 2,500 to 200,000 were obtained from the results.

The proportion of the low molecular weight component in the electrophotographic toner A-3 was 70% by weight, and the proportion of the THF insoluble gel component was 8% by weight. The viscosity at 100° C. was $2 \times 10^5$ Pa·s, and the viscosity at 110° C. was $5 \times 10^4$ Pa·s.

[Electrophotographic Toner B-3]

(Composition of Electrophotographic Toner B-3)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3,000; weight average molecular weight 5,000; molecular weight peak 5,000) 10% by weight Polyester resin(polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 84% by weight Carbon black (#25B made by Mitsubishi Chemical Co., Ltd.) 6% by weight (Method for Manufacturing Electrophotographic Toner B-3)

The components above were sufficiently pre-mixed with a Henshel mixer, melt-kneaded with an extruder, and pulverized with a jet mill after cooling. The pulverized powder was classified with a wind classifier to obtain a black toner B-3 with a mean volume diameter of 8.0 µm.

The black toner B-3 (100 parts by weight) and 0.6 parts by weight of hydrophobic titanium fine particles as an additive with a BET specific surface area of 100 m²/g were mixed with a Henshel mixer to prepare a electrophotographic toner B-3.

(Properties of Electrophotographic Toner B-3)

The specific number average molecular weight, specific weight average molecular weight and specific molecular weight peak of the THF soluble fraction were determined by gel permeation chromatographic measurements by dissolving the electrophotographic toner B-3 obtained in THF. A specific number average molecular weight of 5,000, specific weight average molecular weight of 130,000 and specific molecular weight peak of 9,000 to 1,400,000 were obtained from the results.

The proportion of the low molecular weight component in the electrophotographic toner B-3 was 60% by weight, and the proportion of the THF insoluble gel component was 20% by weight.

The viscosity at 100° C. was $5 \times 10^6$ Pa·s, and the viscosity at 110° C. was $8 \times 10^5$ Pa·s.

[Electrophotographic Toner C-3]

(Composition of Electrophotographic Toner C-3)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 45% by weight Polyester resin(polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 25% by weight Titanium oxide (CR60 made by Ishihara Sangyo Kaisha, Ltd.) 30% by weight (Method for Manufacturing Electrophotographic Toner C-3)

The components above were sufficiently pre-mixed with a Henshel mixer, melt-kneaded with an extruder, and pulverized with a jet mill after cooling. The pulverized powder was classified with a wind classifier to obtain a white toner C-3 with a mean volume diameter of 8.0 µm.

The white toner C-3 (100 parts by weight) and 0.6 parts by weight of hydrophobic titanium fine particles as an additive with a BET specific surface area of 100 m²/g were mixed with a Henshel mixer to prepare a electrophotographic toner C-3.

(Properties of Electrophotographic Toner C-3)

The specific number average molecular weight, specific weight average molecular weight and specific molecular weight peak of the THF soluble fraction were determined by gel permeation chromatographic measurements by dissolving the electrophotographic toner C-3 obtained in THF. A specific number average molecular weight of 2,000, specific weight average molecular weight of 40,000 and specific molecular weight peak of 2,500 to 200,000 were obtained from the results.

The proportion of the low molecular weight component in the electrophotographic toner C-3 was 70% by weight, and the proportion of the THF insoluble gel component was 8% by weight.

The viscosity at 100° C. was $2 \times 10^5$ Pa·s, and the viscosity at 110° C. was $2 \times 10^4$ Pa·s.

[Electrophotographic Toner D-3]

(Composition of Electrophotographic Toner D-3)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 56% by weight Polyester resin(polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 32% by weight C.I. pigment red 122/C.I. pigment red 57:1=3/2 12% by weight (Method for Manufacturing Electrophotographic Toner D-3)

The components above were sufficiently pre-mixed with a Henshel mixer, melt-kneaded with an extruder, and pulverized with a jet mill after cooling. The pulverized powder was classified with a wind classifier to obtain a magenta color toner D-3 with a mean volume diameter of 8.0 µm.

The magenta color toner D-3 (100 parts by weight) and 0.6 parts by weight of hydrophobic titanium fine particles as an additive with a BET specific surface area of 100 m²/g were mixed with a Henshel mixer to prepare a electrophotographic toner D-3.

(Properties of Electrophotographic Toner D-3)

The specific number average molecular weight, specific weight average molecular weight and specific molecular weight peak of the THF soluble fraction were determined by gel permeation chromatographic measurements by dissolving the electrophotographic toner D-3 obtained in THF. A specific number average molecular weight of 2,000, specific weight average molecular weight of 40,000 and specific molecular weight peak of 2,500 to 200,000 were obtained from the results.

The proportion of the low molecular weight component in the electrophotographic toner D-3 was 70% by weight, and the proportion of the THF insoluble gel component was 8% by weight.

The viscosity at 100° C. was $4 \times 10^5$ Pa·s, and the viscosity at 110° C. was $9 \times 10^4$ Pa·s.

[Electrophotographic Toner E-3]

(Composition of Electrophotographic Toner E-3)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 94% by weight Carbon black (#25B made by Mitsubishi Chemical Co., Ltd.) 6% by weight (Method for Manufacturing Electrophotographic Toner E-3)

The components above were sufficiently pre-mixed with a Henshel mixer, melt-kneaded with an extruder, and pulverized with a jet mill after cooling. The pulverized powder was classified with a wind classifier to obtain a black toner E-3 with a mean volume diameter of 8.0 μm.

The black toner E-3 (100 parts by weight) and 0.6 parts by weight of hydrophobic titanium fine particles as an additive with a BET specific surface area of 100 m²/g were mixed with a Henshel mixer to prepare an electrophotographic toner E-3.

(Properties of Electrophotographic Toner E-3)

The specific number average molecular weight, specific weight average molecular weight and specific molecular weight peak of the THF soluble fraction were determined by gel permeation chromatographic measurements by dissolving the electrophotographic toner E-3 obtained in THF. A specific number average molecular weight of 2,500, specific weight average molecular weight of 4,500 and specific molecular weight peak of 4,500 were obtained from the results.

The proportion of the low molecular weight component in the electrophotographic toner E-3 was 95% by weight, and the proportion of the THF insoluble gel component was 0% by weight.

[Electrophotographic Toner F-3]

(Composition of Electrophotographic Toner F-3)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 6,000; weight average molecular weight 60,000; molecular weight peak 10,000; gel component 35% by weight) 94% by weight Carbon black (#25B made by Mitsubishi Chemical Co., Ltd.) 6% by weight (Method for Manufacturing Electrophotographic Toner F-3)

The components above were sufficiently pre-mixed with a Henshel mixer, melt-kneaded with an extruder, and pulverized with a jet mill after cooling. The pulverized powder was classified with a wind classifier to obtain a black toner F-3 with a mean volume diameter of 8.0 μm.

The black toner F-3 (100 parts by weight) and 0.6 parts by weight of hydrophobic titanium fine particles as an additive with a BET specific surface area of 100 m²/g were mixed with a Henshel mixer to prepare a electrophotographic toner F-3.

(Properties of Electrophotographic Toner F-3)

The specific number average molecular weight, specific weight average molecular weight and specific molecular weight peak of the THF soluble fraction were determined by gel permeation chromatographic measurements by dissolving the electrophotographic toner F-3 obtained in THF. A specific number average molecular weight of 5,500, specific weight average molecular weight of 55,000 and specific molecular weight peak of 9,500 were obtained from the results.

The proportion of the low molecular weight component in the electrophotographic toner F-3 was 50% by weight, and the proportion of the THF insoluble gel component was 30% by weight.

[Evaluation of Pulverizing Ability of the Electrophotographic Toner]

Pulverizing abilities of the electrophotographic toners A-3 to F-3 during the manufacturing process were evaluated. Pulverizing ability is evaluated by the amount of the toner pulverized per unit time.

Pulverizing ability of each electrophotographic toners A-3 to F-3 was evaluated at an air pressure of 588 Pa·s (6 kgf/cm²). The pulverizing abilities of the toner of 20 kg/h or more and 20 kg/h at an air pressure of 588 Pa·s (6 kgf/cm²) were evaluated as good (O) and poor (x), respectively. The results are shown in Table 3.

TABLE 3

|  | Toner | | | | | |
| --- | --- | --- | --- | --- | --- | --- |
|  | A-3 | B-3 | C-3 | D-3 | E-3 | F-3 |
| Pulverizing Ability | O | O | O | O | O | O |
|  | 35 kg/h | 25 kg/h | 32 kg/h | 30 kg/h | 45 kg/h | 10 kg/h |

Examples 6 to 9 and Comparative Examples 5 to 9

Two component developers A-3 to F-3 were prepared using the electrophotographic toners A-3 to F-3 and carriers described below, obtaining the display panel in Examples 6 to 9 and Comparative examples 5 to 9. The electrophotographic toners used for forming the image portions and background portions are as shown in Table 4 below.

[Manufacture of Carrier]

(Composition of Carrier)

Ferrite particles (electrical resistance $1 \times 10^9$ Ω·cm) 100 parts by weight Toluene 14 parts by weight Perfluorooctylethyl acrylate/methyl methacrylate copolymer (copolymerization ratio 40:60, weight average molecular weight 50,000) 1.6 parts by weight Carbon black (VXC-72 made by Cabott Co.) 0.12 parts by weight Cross-linked melamine resin (volume average mean particle diameter 0.3 μm) 0.3 parts by weight (Method for Manufacturing Carrier)

The above components except the ferrite particles were dispersed for 1 hour with a sand-mill to prepare a film-forming solution. After stirring the film-forming solution and ferrite particles in a vacuum degassing type kneader for 30 minutes at 60° C., toluene was evaporated off in vacuum to form a coating film on the ferrite particles, thereby manufacturing a carrier.

[Preparation of Two Component Developer]

A two component developer A-3 was prepared by mixing 6 parts by weight of the electrophotographic toner A-3 and 94 parts by weight of the carrier. Two component developers B-3 to F-3 were also prepared by the same method above using the electrophotographic toners B-3 to F-3.

Image portions and background portions as display panels A-3 to F-3 for vehicle mounting meter panels were formed using the two component developers A-3 to F-3. The image portions and background portions were formed on a polyethylene terephthalate film as an image recording medium with a thickness of 150 μm using an electrophotographic copy machine (CDT 60 made by Fuji Xerox Co.) under the TMA conditions shown in Table 4.

The optical densities of each image portion and background portion were measured using a HR100 type reflection and transmittance meter made by Murakami Color Research Laboratory Immediately after forming an image, the meter panel for mounting on a vehicle formed as described above was assembled into an Assy body, image qualities of the image portion and background portion were visually evaluated after allowing the meter panel to stand for 200 hours at 100° C. The results are shown in Table 4.

The display panels A-3 to F-3 on which the image portion and background portion have been fixed were heat-treated at a given temperature for a given hours in a constant temperature bath. The heat treatment conditions are also shown in Table 4.

Pinhole ratios of the display panels A-3 to F-3 were evaluated by the same method as hitherto described, and the results are shown in Table 4.

TABLE 4

| | Image Portion | | | | | Background Portion | | | | | Heat treatment |
|---|---|---|---|---|---|---|---|---|---|---|---|
| | Toner | TMA mg/cm² | Pinhole Ratio (%) | Image Quality Initial | After | Toner | TMA mg/cm² | Pinhole Ratio (%) | Image Quality Initial | After | Condition |
| Example 6 | C-3 white | 0.7 | $3 \times 10^{-4}$ | No Problem | No Problem | A-3 Black | 1.8 | $4 \times 10^{-4}$ | No Problem | No Problem | 100° C. 30 min |
| Example 7 | D-3 magenta | 0.9 | $2 \times 10^{-4}$ | No Problem | No Problem | B-3 Black | 1.8 | $6 \times 10^{-4}$ | No Problem | No Problem | 100° C. 45 min |
| Example 8 | C-3 white | 0.7 | $2 \times 10^{-4}$ | No Problem | No Problem | A-3 Black | 1.8 | $3 \times 10^{-4}$ | No Problem | No Problem | 110° C. 15 min |
| Example 9 | D-3 magenta | 0.9 | $2 \times 10^{-4}$ | No Problem | No Problem | B-3 Black | 1.8 | $5 \times 10^{-4}$ | No Problem | No Problem | 110° C. 30 min |
| Comparative Examples 5 | C-3 white | 0.7 | $3 \times 10^{-4}$ | No Problem | No Problem | E-3 Black | 1.8 | $1 \times 10^{-4}$ | No Problem | Image distortion occurs | 100° C. 30 min |
| Comparative Examples 6 | C-3 white | 0.7 | $3 \times 10^{-2}$ | No Problem | No Problem | A-3 Black | 1.8 | $6 \times 10^{-2}$ | No Problem | No Problem | — |
| Comparative Examples 7 | D-3 magenta | 0.9 | $5 \times 10^{-2}$ | No Problem | No Problem | B-3 Black | 1.8 | $4 \times 10^{-2}$ | No Problem | No Problem | — |
| Comparative Examples 8 | C-3 white | 0.7 | $4 \times 10^{-2}$ | No Problem | No Problem | E-3 Black | 1.8 | $3 \times 10^{-2}$ | No Problem | Image distortion occurs | — |
| Comparative Examples 9 | C-3 white | 0.7 | $2 \times 10^{-2}$ | No Problem | No Problem | F-3 Black | 1.8 | $3 \times 10^{-2}$ | No Problem | No Problem | — |

Table 4 shows that the display panels in Examples 6 to 9 have a small pinhole ratio while having a good effect that the image quality is favorable at the initial stage of the test as well as after the test.

As hitherto described, the invention provides a display panel having a small number of the pinholes on the image portion and background portion while being free from distortion of the image at a temperature as high as 100° C. by forming the image portion and background portion by electrophotography.

Examples and Comparative Examples of the Sixteenth Aspect of Display Panel

Examples 10 to 12 and Comparative Examples 10 to 12

[Electrophotographic Toner A-4]

(Composition of Electrophotographic Toner A-4)

Polyester resin (polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 60% by weight Polyester resin (polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 34% by weight Carbon Black (#25B made by Mitsubishi Chemical Co., Ltd., Ltd.) 6% by weight (Method for Manufacturing Electrophotographic Toner A-4)

The components above were sufficiently pre-mixed with a Henshel mixer, melt-kneaded with an extruder, and pulverized with a jet mill after cooling. The pulverized powder was classified with a wind classifier to obtain a black toner A-4 with a mean volume diameter of 8.0 µm.

The black toner A-4 (100 parts by weight) and 0.6 parts by weight of hydrophobic titanium fine particles as an additive with a BET specific surface area of 100 m$^2$/g were mixed with a Henshel mixer to prepare an electrophotographic toner A-4.

(Properties of Electrophotographic Toner A-4)

The specific number average molecular weight,.specific weight average molecular weight and specific molecular weight peak of the THF soluble fraction were determined by gel permeation chromatographic measurements by dissolving the electrophotographic toner A-4 obtained in THF. A specific number average molecular weight of 2,000, specific weight average molecular weight of 40,000 and specific molecular weight peak between 2,500 and 200,000 were obtained from the results.

The proportion of the low molecular weight component in the electrophotographic toner A-4 was 70% by weight, and the proportion of the THF insoluble gel component was 8% by weight. The viscosity at 100° C. was 2×10$^5$ Pa·s.

[Electrophotographic Toner B-4]

(Composition of Electrophotographic Toner B-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 10% by weight Polyester resin (polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 84% by weight Carbon Black (#25B made by Mitsubishi Chemical Co., Ltd., Ltd.) 6% by weight (Method for Manufacturing Electrophotographic Toner B-4)

The components above were sufficiently pre-mixed with a Henshel mixer, melt-kneaded with an extruder, and pulverized with a jet mill after cooling. The pulverized powder was classified with a wind classifier to obtain a black toner B-4 with a mean volume diameter of 8.0 µm.

The black toner B-4 (100 parts by weight) and 0.6 parts by weight of hydrophobic titanium fine particles as an additive with a BET specific surface area of 100 m$^2$/g were mixed with a Henshel mixer to prepare an electrophotographic toner B-4.

(Properties of Electrophotographic Toner B-4)

The specific number average molecular weight, specific weight average molecular weight and specific molecular weight peak of the THF soluble fraction were determined by gel permeation chromatographic measurements by dissolving the electrophotographic toner B-4 obtained in THF. A specific number average molecular weight of 5,000, specific weight average molecular weight of 130,000 and specific molecular weight peak between 9,000 and 1,400,000 were obtained from the results.

The proportion of the low molecular weight component in the electrophotographic toner B-4 was 60% by weight, and the proportion of the THF insoluble gel component was 20% by weight. The viscosity at 100° C. was 2×10$^6$ Pa·s.

[Electrophotographic Toner C-4]

(Composition of Electrophotographic Toner C-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 56% by weight Polyester resin (polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e=85:10:5:50:50; number average molecular weight 6,000; weight average molecular weight 60,000; molecular weight peak 10,000; and gel component 35% by weight) 32% by weight Carbon Black (#25B made by Mitsubishi Chemical Co., Ltd.) 12% by weight (Method for Manufacturing Electrophotographic Toner C-4)

The components above were sufficiently pre-mixed with a Henshel mixer, melt-kneaded with an extruder, and pulverized with a jet mill after cooling. The pulverized powder was classified with a wind classifier to obtain a black toner C-4 with a mean volume diameter of 8.0 µm.

The black toner C-4 (100 parts by weight) and 0.6 parts by weight of hydrophobic titanium fine particles as an additive with a BET specific surface area of 100 m$^2$/g were mixed with a Henshel mixer to prepare an electrophotographic toner C-4.

(Properties of Electrophotographic Toner C-4)

The specific number average molecular weight, specific weight average molecular weight and specific molecular weight peak of the THF soluble fraction were determined by gel permeation chromatographic measurements by dissolving the electrophotographic toner C-4 obtained in THF. A specific number average molecular weight of 2,000, specific weight average molecular weight of 40,000 and specific molecular weight peak between 2,500 and 200,000 were obtained from the results.

The proportion of the low molecular weight component in the electrophotographic toner C-4 was 70% by weight, and the proportion of the THF insoluble gel component was 8% by weight. The viscosity at 1 00° C. was 4×10$^5$ Pa·s.

[Electrophotographic Toner D-4]

(Composition of Electrophotographic Toner D-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 84% by weight Carbon Black (#25B made by Mitsubishi Chemical Co., Ltd.) 16% by weight (Method for Manufacturing Electrophotographic Toner D-4)

The components above were sufficiently pre-mixed with a Henshel mixer, melt-kneaded with an extruder, and pulverized with a jet mill after cooling. The pulverized powder was classified with a wind classifier to obtain a black toner D-4 with a mean volume diameter of 8.0 μm.

The black toner D (100 parts by weight) and 0.6 parts by weight of hydrophobic titanium fine particles as an additive with a BET specific surface area of 100 m$^2$/g were mixed with a Henshel mixer to prepare a electrophotographic toner D-4.

(Properties of Electrophotographic Toner D-4)

The specific number average molecular weight, specific weight average molecular weight and specific molecular weight peak of the THF soluble fraction were determined by gel permeation chromatographic measurements by dissolving the electrophotographic toner D-4 obtained in THF. A specific number average molecular weight of 3,000, specific weight average molecular weight of 5,000 and specific molecular weight peak of 5,000 were obtained from the results.

The proportion of the low molecular weight component in the electrophotographic toner D-4 was 95% by weight, and the proportion of the THF insoluble gel component was 0% by weight. The viscosity at 100° C. was 3×10$^5$ Pa·s.

[Electrophotographic Toner E-4]

(Composition of Electrophotographic Toner E-4)

Polyester resin (polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 97% by weight Carbon Black (#25B made by Mitsubishi Chemical Co., Ltd.) 3% by weight (Method for Manufacturing Electrophotographic Toner E-4)

The components above were sufficiently pre-mixed with a Henshel mixer, melt-kneaded with an extruder, and pulverized with a jet mill after cooling. The pulverized powder was classified with a wind classifier to obtain a black toner E-4 with a mean volume diameter of 8.0 μm.

The black toner E-4 (100 parts by weight) and 0.6 parts by weight of hydrophobic titanium fine particles as an additive with a BET specific surface area of 100 m$^2$/g were mixed with a Henshel mixer to prepare an electrophotographic toner E-4.

(Properties of Electrophotographic Toner E-4)

The specific number average molecular weight, specific weight average molecular weight and specific molecular weight peak of the THF soluble fraction were determined by gel permeation chromatographic measurements by dissolving the electrophotographic toner E-4 obtained in THF. A specific number average molecular weight of 2,500, specific weight average molecular weight of 4,500 and specific molecular weight peak of 4,500 were obtained from the results.

The proportion of the low molecular weight component in the electrophotographic toner E-4 was 95% by weight, and the proportion of the THF insoluble gel component was 0% by weight. The viscosity at 100° C. was 2×10$^4$ Pa·s.

[Electrophotographic Toner F-4]

(Composition of Electrophotographic Toner F-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 45% by weight Polyester resin(polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e =85:10:5: 50:50; number average molecular weight 6,000; weight average molecular weight 60,000; molecular weight peak 10,000; gel component 35% by weight) 25% by weight Titanium oxide (CR60 made by Ishihara Sangyo Kaisha, Ltd.) 30% by weight (Method for Manufacturing Electrophotographic Toner F-4)

The components above were sufficiently pre-mixed with a Henshel mixer, melt-kneaded with an extruder, and pulverized with a jet mill after cooling. The pulverized powder was classified with a wind classifier to obtain a white toner F-4 with a mean volume diameter of 8.0 μm.

The white toner F-4 (100 parts by weight) and 0.6 parts by weight of hydrophobic titanium fine particles as an additive with a BET specific surface area of 100 m$^2$/g were mixed with a Henshel mixer to prepare a electrophotographic toner F-4.

(Properties of Electrophotographic Toner F-4)

The specific number average molecular weight, specific weight average molecular weight and specific molecular weight peak of the THF soluble fraction were determined by gel permeation chromatographic measurements by dissolving the electrophotographic toner F-4 obtained in THF. A specific number average molecular weight of 2,000, specific weight average molecular weight of 40,000 and specific molecular weight peak between 2,500 and 200,000 were obtained from the results.

The proportion of the low molecular weight component in the electrophotographic toner F-4 was 70% by weight, and the proportion of the THF insoluble gel component was 8% by weight. The viscosity at 100° C. was 2×10$^5$ Pa·s.

(Electrophotographic Toner G-4)

(Composition of Electrophotographic Toner G-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 56% by weight Polyester resin(polycondensation product of terephthalic acid (a), trimellitic acid anhydride (b), dodecenyl succinic acid (c), bisphenol A-propylene oxide adduct (d) and bisphenol A-ethylene oxide adduct (e) in a polycondensation molar ratio of a:b:c:d:e =85:10:5:50:50; number average molecular weight 6,000; weight average molecular weight 60,000; molecular weight peak 10,000; gel component 35% by weight) 32% by weight C.I. pigment red 122/C.I pigment red 57:1=3/2 12% by weight (Method for Manufacturing Electrophotographic Toner G-4)

The components above were sufficiently pre-mixed with a Henshel mixer, melt-kneaded with an extruder, and pulverized with a jet mill after cooling. The pulverized powder was classified with a wind classifier to obtain a magenta color toner G-4 with a mean volume diameter of 8.0 μm.

The magenta color toner G-4 (100 parts by weight) and 0.6 parts by weight of hydrophobic titanium fine particles as an additive with a BET specific surface area of 100 m$^2$/g were mixed with a Henshel mixer to prepare a electrophotographic toner G-4.

(Properties of Electrophotographic Toner G-4)

The specific number average molecular weight, specific weight average molecular weight and specific molecular weight peak of the THF soluble fraction were determined by gel permeation chromatographic measurements by dissolving the electrophotographic toner G-4 obtained in THF. A specific number average molecular weight of 2,000, specific weight average molecular weight of 40,000 and specific molecular weight peak between 2,500 and 200,000 were obtained from the results.

The proportion of the low molecular weight component in the electrophotographic toner G-4 was 70% by weight, and the proportion of the THF insoluble gel component was 8% by weight. The viscosity at 100° C. was 4×10$^5$ Pa·s.

(Electrophotographic Toner H-4)

(Composition of Electrophotographic Toner H-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000) 94% by weight Carbon black (#25B, Mitsubishi Chemical Co., Ltd.) 6% by weight (Method for Manufacturing Electrophotographic Toner H-4)

The components above were sufficiently pre-mixed with a Henshel mixer, melt-kneaded with an extruder, and pulverized with a jet mill after cooling. The pulverized powder was classified with a wind classifier to obtain a black toner H-4 with a mean volume diameter of 8.0 μm.

The black toner H-4 (100 parts by weight) and 0.6 parts by weight of hydrophobic titanium fine particles as an additive with a BET specific surface area of 100 m$^2$/g were mixed with a Henshel mixer to prepare an electrophotographic toner H-4.

(Properties of Electrophotographic Toner H-4)

The specific number average molecular weight, specific weight average molecular weight and specific molecular weight peak of the THF soluble fraction were determined by gel permeation chromatographic measurements by dissolving the electrophotographic toner H-4 obtained in THF. A specific number average molecular weight of 2,500, specific weight average molecular weight of 4,500 and specific molecular weight peak of 4,500 were obtained from the results.

The proportion of the low molecular weight component in the electrophotographic toner H-4 was 95% by weight, and the proportion of the THF insoluble gel component was 0% by weight. The viscosity at 100° C. was 2×10$^4$ Pa·s.

[Electrophotographic Toner I-4]

(Composition of Electrophotographic Toner I-4)

Polyester resin(polycondensation product of terephthalic acid (a), fumaric acid (b), bisphenol A-propylene oxide adduct (c) and bisphenol A-ethylene oxide adduct (d) in a polycondensation molar ratio of a:b:c:d=80:20:50:50; number average molecular weight 3000; weight average molecular weight 5,000; molecular weight peak 5,000 h; and gel component 35% by weight) 94% by weight Carbon black (#25B, Mitsubishi Chemical Co., Ltd.) 6% by weight (Method for Manufacturing Electrophotographic Toner I-4)

The components above were sufficiently pre-mixed with a Henshel mixer, melt-kneaded with an extruder, and pulverized with a jet mill after cooling. The pulverized powder was classified with a wind classifier to obtain a black toner I-4 with a mean volume diameter of 8.0 μm.

The black toner I-4 (100 parts by weight) and 0.6 parts by weight of hydrophobic titanium fine particles as an additive with a BET specific surface area of 100 m$^2$/g were mixed with a Henshel mixer to prepare an electrophotographic toner I-4.

(Properties of Electrophotographic Toner I-4)

The specific number average molecular weight, specific weight average molecular weight and specific molecular weight peak of the THF soluble fraction were determined by gel permeation chromatographic measurements by dissolving the electrophotographic toner I-4 obtained in THF. A specific number average molecular weight of 5,500, specific weight average molecular weight of 55,000 and specific molecular weight peak of 9,500 were obtained from the results.

The proportion of the low molecular weight component in the electrophotographic toner I-4 was 50% by weight, and the proportion of the THF insoluble gel component was 30% by weight. The viscosity at 100° C. was 2×10$^7$ Pa·s.

[Evaluation of Pulverizing Ability of the Electrophotographic Toner]

Pulverizing abilities of the electrophotographic toners A-4 to I-4 during the manufacturing process were evaluated. Pulverizing ability is evaluated by the amount of the toner pulverized per unit time.

Pulverizing ability of each electrophotographic toners A-4 to I-4 was evaluated at an air pressure of 588 Pa·s (6 kgf/cm$^2$). The pulverizing abilities of the toner of 20 kg/h or more and less than 20 kg/h at an air pressure of 588 Pa·s (6 kgf/cm$^2$) were evaluated as good (O) and poor (x), respectively. The results are shown in Table 5.

TABLE 5

|  | Toner | | | | | | | | |
| --- | --- | --- | --- | --- | --- | --- | --- | --- | --- |
|  | A-4 | B-4 | C-4 | D-4 | E-4 | F-4 | G-4 | H-4 | I-4 |
| Pulverizing Ability | O 35 kg/h | O 25 kg/h | O 30 kg/h | O 30 kg/h | O 33 kg/h | O 32 kg/h | O 30 kg/h | O 45 kg/h | X 10 kg/h |

Examples 10 to 12 and
Comparative Examples 10 to 12

Two component developers A-4 to H-4 were prepared using the electrophotographic toners A-4 to H-4 and carriers described below. Image portions and background portions were formed using the two component developers A-4 to H-4 to obtain display panels in Examples 10 to 12 and Comparative Examples 10 to 12. The electrophotographic toners used for forming the image portions and background portions are as shown in Table 6 below.

[Manufacture of Carrier]

Carriers were prepared by the same composition and method as those in Examples 6 to 9 and Comparative Examples 5 to 9.

[Preparation of Two Component Developer]

A two component developer A was prepared by mixing 6 parts by weight of the electrophotographic toner A-4 and 94 parts by weight of the carrier. Two component developers B-4 to H-4 were also prepared by the same method above using the electrophotographic toners B-4 to H-4.

Image portions and background portions as display panels A-4 to H-4 for vehicle mounting meter panels were formed using the two component developers A-4 to H-4. The image portions and background portions were formed on a polyethylene terephthalate film as an image recording medium with a thickness of 150 μm using an electrophotographic copy machine (CDT 60 made by Fuji Xerox Co., Ltd.) under the TMA conditions shown in Table 6.

The optical densities of each image portion and background portion were measured using a HR100 type reflection and transmittance meter made by Murakami Color Research Laboratory.

Immediately after forming an image, the meter panel for mounting on a vehicle formed as described above was assembled into an Assy body, and image qualities of the image portion and background portion were visually evaluated after allowing the meter panel to stand for 300 hours at 100° C. The results are shown in Table 6.

Table 6 shows that the each display panel in Examples 10 to 12 is favorable in transparency of the image portion and light-sealing ability of the background portion with an excellent effect that the image quality is good in the initial test as well as after the test.

According to the invention, the display panel on which the image portion and background portion are formed by electrophotography is free from image defects such as fog and scattering of the electrophotographic toner as well as BCO and irregular images. The present invention provides a display panel with high light-sealing ability of the background portion and no distortion of the image at a high temperature of about 100° C.

As hitherto described, the invention provides a display panel having a small number of the pinholes on the image portion and background portion while being free from distortion of the image at a temperature as high as 100° C. by forming the image portion and background portion by electrophotography.

The present invention also provides a display panel on which the pinholes are suppressed from being formed and a method for manufacturing the display panel by forming a toner image on an image recording sheet such as a transparent plastic film by electrophotography. The present invention further provides a display panel in which light-sealing ability of the background portion is sufficiently enhanced by forming a transparent image portion and background portion on an image recording sheet such as a transparent plastic film by electrophotography.

The present invention further provides a display panel on which the image portion and background portion are formed by electrophotography, wherein image defects such as fog and scattering of the electrophotographic toner, and BCO and irregular images are prevented from occurring, light-sealing ability of the background portion is sufficiently enhanced, and the image is not distorted at a high temperature of about 100° C. The present invention further provides a display panel on which the image portion and background portion are formed by electrophotography, wherein the number of the pinholes on the image portion and background

TABLE 6

| | Image Portion | | | | | Background Portion | | | |
| | | | | | | | Transparent | | |
| | Toner | TMA mg/cm$^2$ | Transparent optical density | Image Quality Initial | Image Quality After | Toner | TMA mg/cm$^2$ | Optical Density | Image Quality Initial | Image Quality After |
|---|---|---|---|---|---|---|---|---|---|---|
| Example 10 | F-4 white | 0.7 | 0.6 | No Problem | No Problem | A-4 black | 1.8 | 3.4 | No Problem | No Problem |
| Examples 11 | G-4 magenta | 0.9 | 0.5 | No Problem | No Problem | B-4 black | 1.8 | 3.4 | No Problem | No Problem |
| Example 12 | F-4 white | 0.7 | 0.5 | No Problem | No Problem | C-4 black | 1 | 3.5 | No Problem | No Problem |
| Comparative Example 10 | F-4 white | 0.7 | 0.6 | No Problem | No Problem | D-4 black | 0.9 | 2.9 | BCO occurs | Image distortion occurs |
| Comparative Example 11 | F-4 white | 0.7 | 0.6 | No Problem | No Problem | E-4 black | 2.2 | 2.5 | Irregularities occurs | Image distortion occurs |
| Comparative Example 12 | F-4 white | 0.7 | 0.6 | No Problem | No Problem | H-4 black | 1.8 | 3.4 | No problem | Image distortion occurs | portion is reduced while being free from distortion of images at a high temperature of about 100° C.

What is claimed is:

1. A method of manufacturing a display panel, the display panel comprising a transparent plastic image recording sheet including thereon a background portion electrophotographically fixed to the image recording sheet using a toner, wherein after being fixed on the image recording sheet, the background portion is heated at a temperature where the melt viscosity of the toner becomes $1.0\times10^7$ Pa·s to $1.0\times10^3$ Pa·s, and pinholes formed in the background portion before heat treatment are filled.

2. The method of claim 1, wherein after being fixed on the image recording sheet, the background portion is heated at a temperature where the melt viscosity of the toner becomes $5.0\times10^5$ Pa·s to $1.0\times10^4$ Pa·s.

* * * * *